(12) United States Patent
Chow et al.

(10) Patent No.: US 8,266,712 B2
(45) Date of Patent: Sep. 11, 2012

(54) PRIVACY THROUGH ARTIFICIAL CONTEXTUAL DATA GENERATION

(75) Inventors: Richard Chow, Sunnyvale, CA (US);
Philippe J. P. Golle, San Francisco, CA (US); Runting Shi, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 345 days.

(21) Appl. No.: 12/611,684

(22) Filed: Nov. 3, 2009

(65) Prior Publication Data
US 2011/0107434 A1 May 5, 2011

(51) Int. Cl.
*G06F 7/04* (2006.01)
(52) U.S. Cl. ........................................................ 726/28
(58) Field of Classification Search ........................ None
See application file for complete search history.

(56) References Cited

U.S. PATENT DOCUMENTS
2010/0274815 A1 * 10/2010 Vanasco ........................ 707/798

OTHER PUBLICATIONS

Krumm, John, "Realistic Driving Trips for Location Privacy", H. Tokuda et al., (Eds.): Prevasive 2009, LNCS 5538, pp. 25-41, 2009.
Shankar, Pravin et al., "Privately Querying Location-based Services with SybilQuery", Ubicomp 2009, Sep. 30-Oct. 3, Orlando, Florida.

* cited by examiner

*Primary Examiner* — Brandon Hoffman
(74) *Attorney, Agent, or Firm* — Shun Yao; Park, Vaughan, Fleming & Dowler LLP

(57) ABSTRACT

Embodiments of the present disclosure provide a method and system for protecting privacy by generating artificial contextual data. The system collects real contextual data related to a user. The system then generates artificial contextual data, based on the collected real contextual data. The system also groups the generated contextual data into one or more groups. Each group of contextual data corresponds to a persona that can be presented as the user's persona. Subsequently, the system transmits the generated contextual data to an entity, thereby allowing the user to obscure the real contextual data related to the user.

21 Claims, 8 Drawing Sheets

PRIVACY THROUGH ARTIFICIAL CONTEXTUAL DATA GENERATION

BACKGROUND

1. Field

This disclosure is generally related to privacy and ubiquitous computing. More specifically, this disclosure is related to protecting the privacy of users of ubiquitous computing services.

2. Related Art

As mobile devices and wireless sensor networks become prevalent and powerful, computer systems are becoming adept at anticipating users' needs through intense analysis of various contextual data. The contextual data analysis increases productivity and social relationships for individuals. Moreover, the contextual data analysis can be used to improve services for corporations by providing, for example, targeted advertising and/or location-based services.

Nevertheless, despite various benefits of contextual data analysis, the collection and/or maintenance of maintenance of contextual data poses sensitive privacy concerns. For instance, giving out the location trace of a user's movements allows others to infer sensitive information related to the user, such as the user's home and/or work addresses, the user's shopping habits, the user's friends and associates, the user's social network memberships and/or affiliations, etc. The user will likely prefer not to make such sensitive information publicly available, because doing so may expose the user to personalized phishing and fraud attacks, which are difficult to detect. In extreme cases, knowledge about a user's real-time location can facilitate serious crimes, such as kidnapping or assassination. Furthermore, a user may sometimes want to withhold his or her whereabouts from others generally or selectively.

One common defense against these data-driven attacks involves perturbing the sensitive data to protect a user's identity. However, in the case of location data, modifying sensitive location data may render the data so imprecise that the data is no longer useful. For example, preserving privacy in location-based data could require a large amount of perturbation and consequently result in serious utility loss.

Another approach to this problem is to rely on security architectures to limit access to this data. For example, consumers generally trust corporations to keep the sensitive data private and secure. The corporations are expected to implement appropriate policies and security measures to protect the data. Another example is, while maintaining user web-search profiles, providers of major web search engines typically limit the retention period of Internet Protocol (IP) addresses and cookie data associated with a user's web search history. However, given the size, pervasiveness, and intelligence value of most sensitive data, it is unrealistic for a corporation to identify all of the potential avenues for breaches of consumers' privacy data.

SUMMARY

One embodiment provides a system that protects privacy by generating artificial contextual data. The system collects real contextual data related to a user. The system generates artificial contextual data, optionally based on the collected real contextual data related to the user. The system then groups the generated contextual data into one or more groups with each group corresponding to a persona that is presented as the user's persona. Finally, the system transmits the generated contextual data to an entity, thereby obscuring the real contextual data related to the user.

In some embodiments, the system is configured to transmit one or more of:
the real contextual data;
the generated contextual data;
the user's persona; and
the persona corresponding to the one or more groups of the generated contextual data.

In some embodiments, the system receives an authorization decision from the user. If the authorization decision indicates that the user grants an authorization to an audience, the system allows the audience to distinguish the generated contextual data from the real contextual data, or allows the audience to distinguish the generated location trace of the user's movement from the real location trace of the user's movement.

In some embodiments, the system receives the departure point, the destination point, and the period of time from the user. Then, the system retrieves one or more historical location traces of the user's movement based on the received departure point, destination point, and the period of time. The system further generates the artificial contextual data using the one or more historical location traces.

In some embodiments, the collected contextual data includes one or more of:
GPS location data;
Carrier location data;
Co-location data;
User calendar data;
Electronic communications;
Social network data; and
Web browsing history data.

In some embodiments, the artificial contextual data are generated by adding noise data to the real contextual data.

Embodiments of present disclosure ensure that, for each persona, the artificial contextual data are internally consistent, thereby preventing a third party from distinguishing the artificial contextual data from the real contextual data without the user's explicit authorization.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method for protecting privacy by generating artificial contextual data. The method can be used to obscure real contextual data about a user with the generated artificial contextual data when privacy of the real contextual data is a concern.

In one embodiment, a computer system collects real contextual data related to a user. Then, the system generates artificial contextual data related to the user, optionally based on the collected real contextual data. Furthermore, the computer system groups the generated contextual data into one or more personas of the user. The persona, as well as the generated contextual data, can be used to obscure the user's real contextual data and hence to protect the user's privacy.

In order to effectively obscure the real contextual data, the generated artificial contextual data about the user are ideally realistic to the audience. For example, when Points A and B and a time period are specified, the computer system can generate a location trace for the user from Point A to Point B during the time period, and ensure that the generated artificial location trace is realistic. That means it is difficult for an audience to tell which location trace is the user's true location trace when the artificial trace is presented together with the user's real location trace.

A computer system with such capabilities has several applications. One application is in the social networking realm. When a user intends to protect the privacy of her true whereabouts, she could substitute her real location trace with an artificial location trace without arousing suspicion by her social connections.

Another application of such a computer system is to use a location-based service without disclosing the user's true whereabouts. For example, the user could generate a number of personas. Each persona could represent the user following a different location trace and engaging in one or more distinct activities. When the generated personas are presented to a location-based service, the location-based service would serve all these personas without knowing which one is real. As a result, in an advertising network using location-based services, the user would receive advertisements targeted for different locations because the advertising network is presented with multiple user personas. However, the user has the option to keep only the advertisement targeted toward her true location or one particular artificial location.

Because the generated artificial contextual data are sufficiently realistic, it is often difficult to distinguish the artificial data from the real data when they are both presented to an audience. In one embodiment, when the user grants an authorization to an audience, the computer system allows the audience to distinguish the artificial data from the real data, for example, by providing additional markers or flags.

In some embodiments, the system generates the artificial contextual data of the user's movement using historical data, such as the user's historical trace between the departure point and the destination point, or the user's historical real contextual data associated with the historical traces.

In further embodiments, the system can generate the artificial data by adding noise to the real data.

Computing Environment

Figure 1:
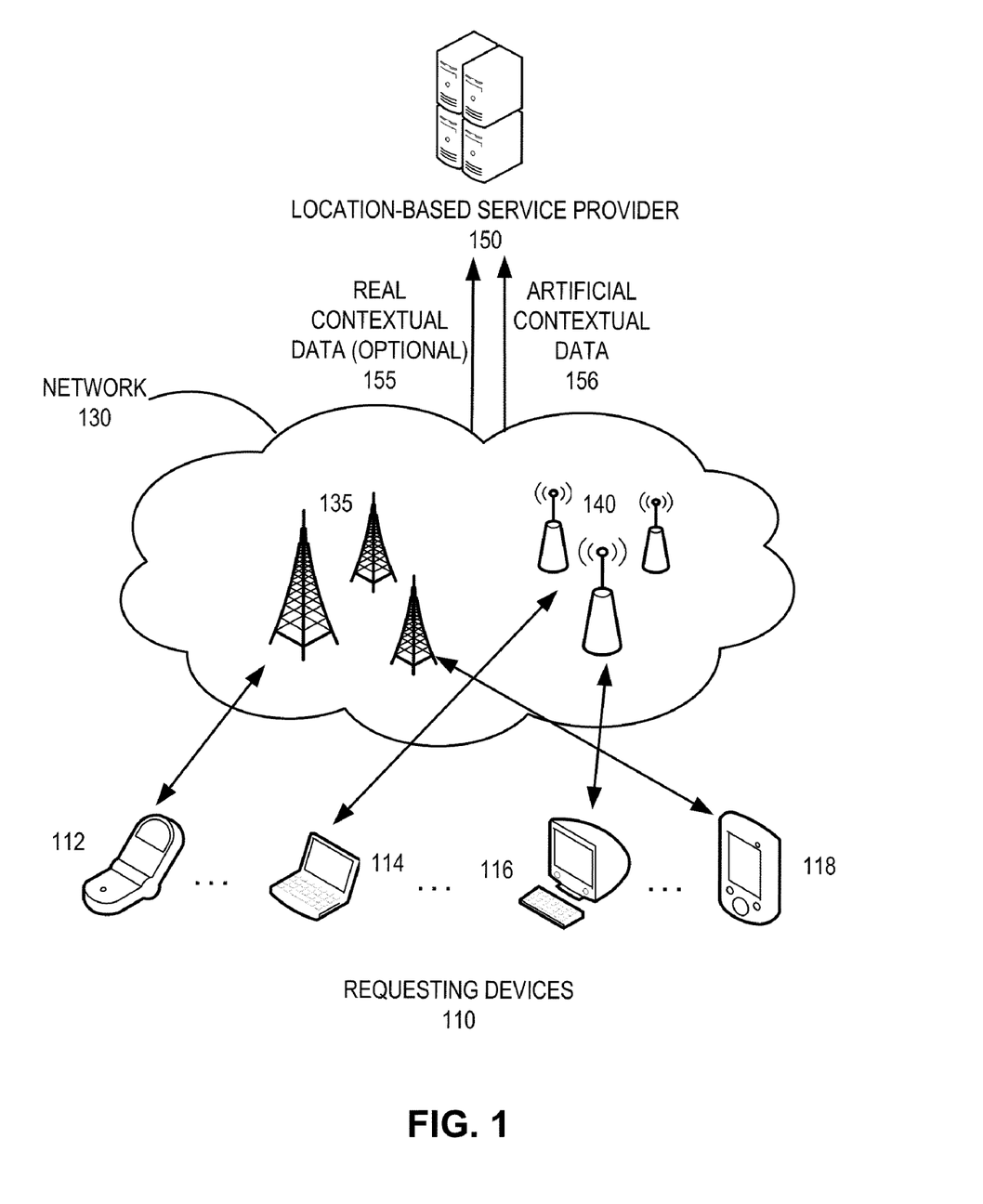
FIG. 1 presents a diagram illustrating a computing environment for protecting privacy by generating artificial contextual data in accordance with an embodiment of the present invention.

FIG. 1 presents a diagram illustrating a computing environment for protecting privacy by generating artificial contextual data in accordance with an embodiment of the present invention. In this example, the computing environment includes one or more requesting devices 110, a network 130, and a location-based service provider 150. Requesting devices 110 can be any computational devices capable of sending and receiving a network message, such as a cellular phone 112, a laptop 114, a workstation 116, a pager (not shown), a personal digital assistant (PDA) 118, and other communication devices. Network 130 can be a wired network, or a wireless network, or both. Furthermore, a wireless network can include, but is not limited to, a satellite communications network, a cellular and PCS network, a wireless local area network, a Bluetooth™ network, and/or a 3G network.

During operation, a user sends a request for location-based service from a requesting device 110 to location-based service provider 150 through network 130. The location-based service request can be, for example, a request to search for nearby restaurants. The request can also be a request for navigation rerouting based on real-time traffic or weather information. In one embodiment, the user sends a real location trace 145 of her movement to location-based service provider 150 through network 130. Upon receiving real contextual data 155 about the user, location-based service provider 150 can provide location-based service to the user.

In another embodiment, requesting device 110 generates artificial contextual data 156 with the help from a privacy server, and send the artificial contextual data 156 to location-based service provider 150 to obscure her real contextual data. In some embodiments, artificial contextual data 156 are organized as one or more groups. Each group corresponds to a persona of the user. Location-based service provider 150 can transmit one or more user personas to its audience. Real contextual data 155 and artificial contextual data 156 may include a location trace, location or co-location data, calendar data, electronic communications, social networking data, web browsing history, etc. A location trace may specify a departure point, a destination point, and a period of time. The generated artificial contextual data 156 are sufficiently realistic in light of the real contextual data, such that it would be difficult for a person to tell which persona or which part of contextual data related to the user persona is real without permission by location-based service provider 150.

Generation of Artificial Contextual Data

Figure 2:
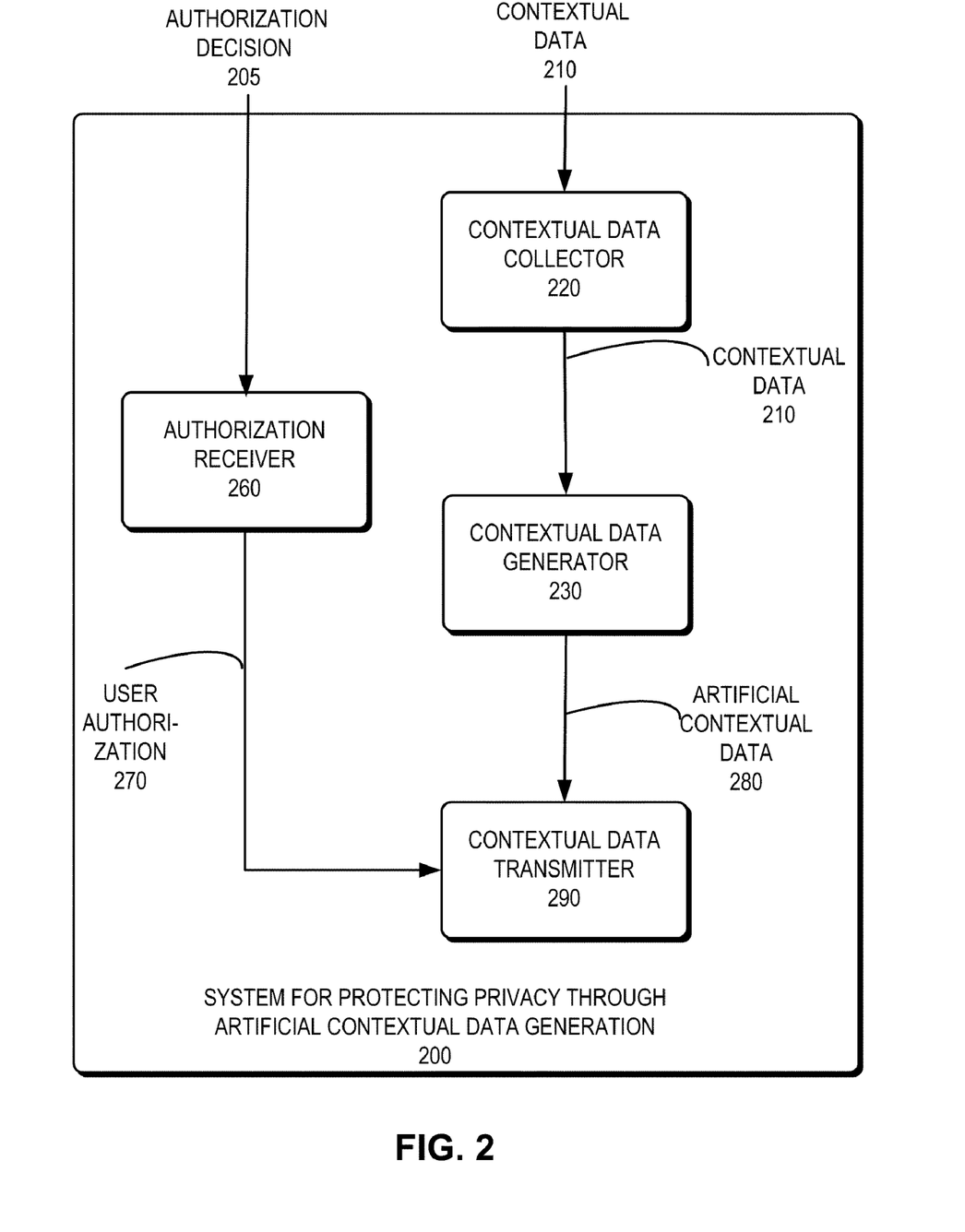
FIG. 2 presents a block diagram of a system for protecting privacy by generating artificial contextual data in accordance with an embodiment of the present invention.

FIG. 2 presents a block diagram of a system for protecting privacy by generating artificial contextual data in accordance with one embodiment. System 200 includes a contextual data collector 220, a contextual data generator 230, and a contextual data transmitter 290. System 200 also optionally includes an authorization receiver 260.

Contextual data collector 220 collects contextual data 210 related to a user from different sources, such as the user's mobile phone, computer, web application accounts, etc. Contextual data 210 may include any kind of data indicating the user's activity, behavior, status or environment at a given time, such as location or co-location data, calendar data, electronic communications, social networking data, web browsing history, etc.

Collected contextual data 210 is then passed to contextual data generator 230, which can be any type of computing device with a processing logic and a communication mechanism.

Contextual data generator 230 generates artificial contextual data 280 of the user. In some embodiments, the generated artificial contextual data 280 shares the same location trace, e.g., departure point, the same destination point, and the same period of time, as the real location trace, thereby allowing the user to obscure her real contextual data by presenting the artificial contextual data 280 in the place of, or along with, the real contextual data. In some embodiments, the generated artificial contextual data 280 are grouped into one or more personas. A persona is a group of contextual data which indicates a user's experience, e.g., the user's movement, the user's behavior, the user's environment, the user's expressions, etc. Note that it may also include something external to the user, for example, what others know about the user, e.g., a meeting on another person's calendar which the user has indicated that she will attend.

Contextual data transmitter 290 receives artificial location trace 240 and artificial persona 280 from trace generator 230 and persona generator 250, and transmits those artificial contextual data to an entity in order to obscure the user's real persona or contextual data. Contextual data transmitter 290 can be a network port, a wireless transmitter, a radio transmitter, a media transmitter, etc., without any limitations.

In some embodiments, system 200 further includes an authorization receiver 260, which receives an authorization decision 205 from the user. If authorization decision 205 indicates that the user has granted the authorization, authorization receiver 260 will pass user authorization 270 to contextual data transmitter 290. When contextual data transmitter 290 receives user authorization 270, contextual data transmitter 290 will allow an entity or audience identified by user authorization 270 to distinguish the artificial contextual data from the real contextual data.

Figure 3:
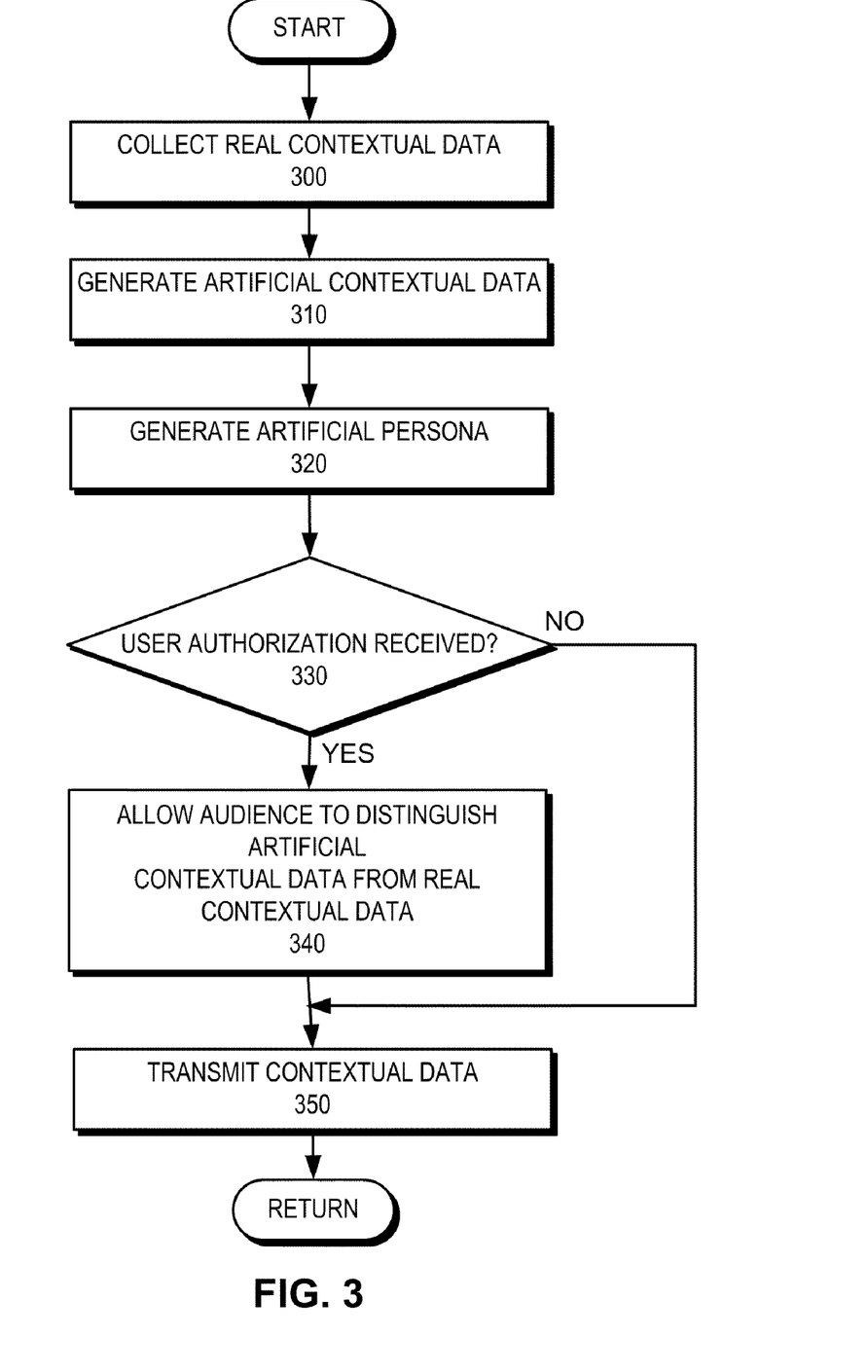
FIG. 3 presents a flowchart illustrating a method for protecting privacy by generating artificial contextual data in accordance with an embodiment of the present invention.
Figure 4:
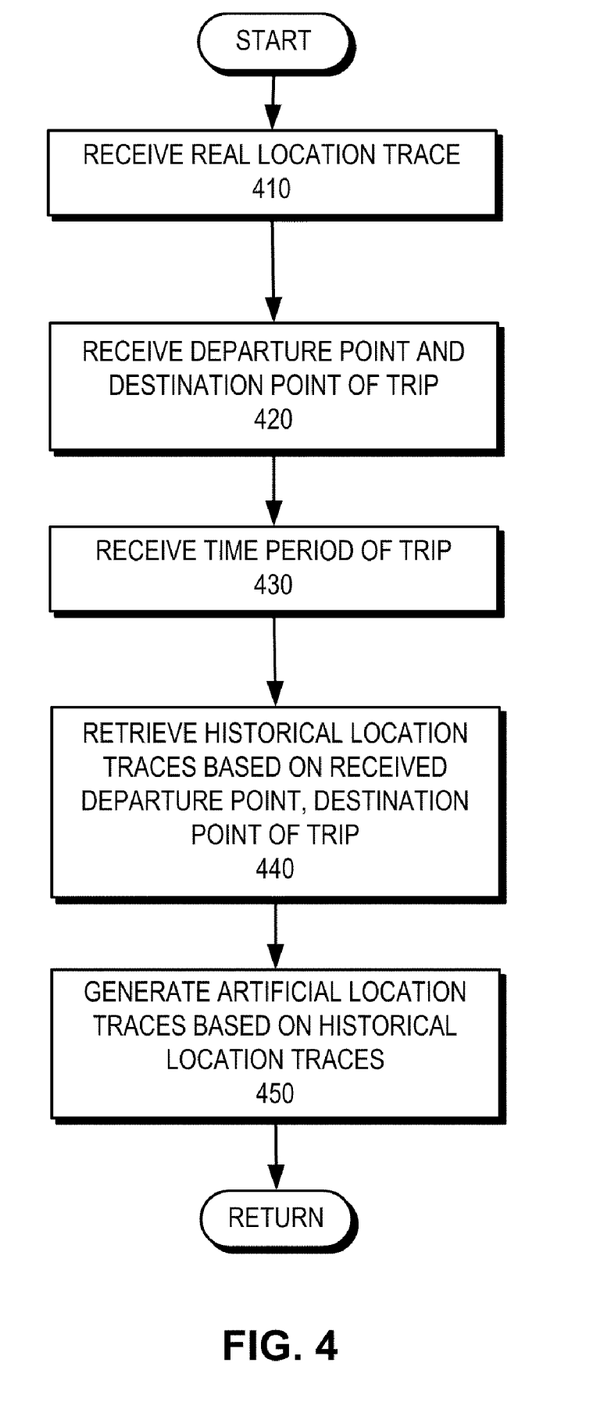
FIG. 4 presents a flowchart illustrating a method for generating artificial location traces in accordance with an embodiment of the present invention.
Figure 5:
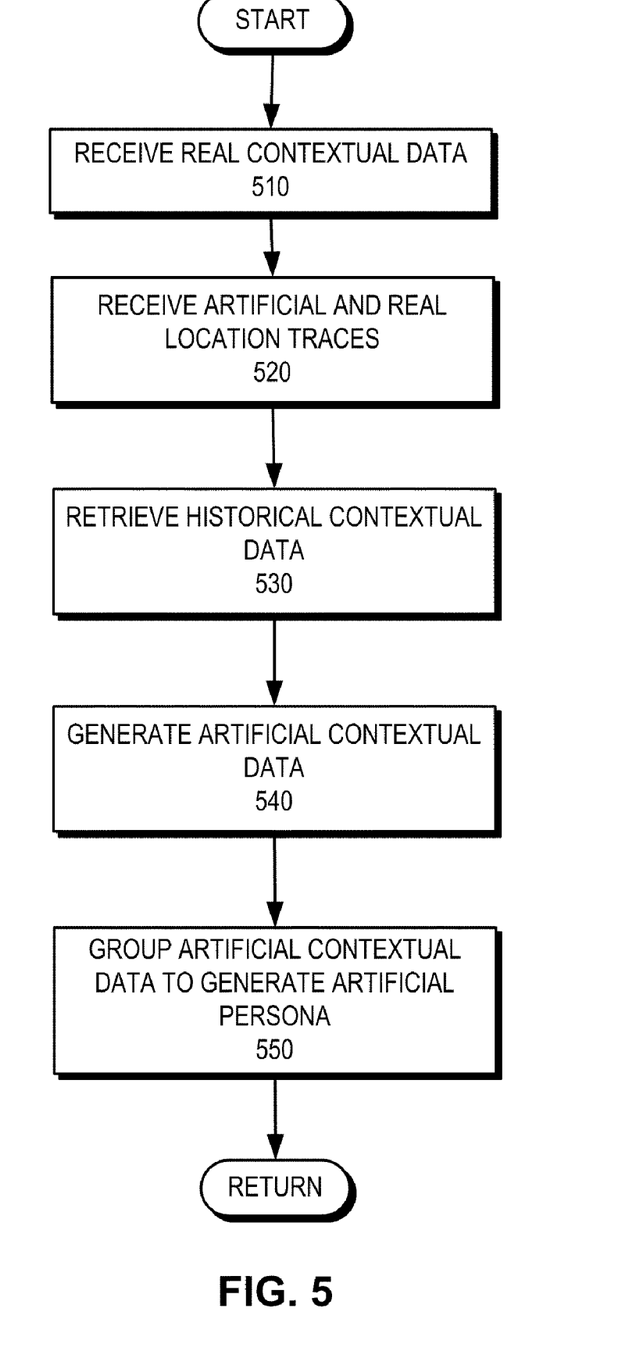
FIG. 5 presents a flowchart illustrating a method for generating an artificial persona from one or more groups of artificial contextual data in accordance with an embodiment of the present invention.

FIGS. 3-5 present flowcharts illustrating methods for generating artificial contextual data and/or location traces of a user's movements in accordance with various embodiments of the present invention. Specifically, FIG. 3 presents a flowchart illustrating a method for protecting privacy by generating artificial contextual data in accordance with one embodiment. During operation, the system collects real contextual data (operation 300). The real contextual data may be collected via a user survey, a data feed, a synchronization to personal information on the user's portable device, or any other kind of user inputs. Alternatively, the real contextual data can be obtained from another person or entity related to the user, such as the user's employer, friends, affiliations, etc. Furthermore, the real contextual data can be collected by web search or data mining of relevant databases.

The system then generates artificial contextual data (operation 310), such as an artificial location trace of the user's movement, based on the collected real contextual data. In one embodiment, the system parses the collected real contextual data to determine a departure point, a destination point, and a period of time, which correspond to the starting location, the ending location, and the duration of the location trace of the user's movement. In another embodiment, the departure point, the destination point, and the period of time are selected or given by a user.

The system can also generate an artificial persona (operation 320) for the user. The artificial persona corresponds to a group of contextual data associated with the user. The contextual data within the group are internally consistent such that the generated artificial persona is sufficiently realistic. For example, if one part of the contextual data indicates that the user has a dentist appointment at a given time, another part of the contextual data such as the location of the user should also show that the user is physically located near a dentist's office.

In some embodiments, multiple artificial personas are generated from different groups of artificial contextual data, real contextual data, or a mixture of both. An audience who is presented with these artificial personas typically cannot tell which persona is the real persona. Thus, the system queries whether a user authorization is received (operation 330). If the user authorization is received, the system allows the audience to distinguish the artificial location trace of the user's movement from the real location trace of the user's movement. Depending on the scope of the user authorization, the system may also allow the audience to distinguish the artificial contextual data from the real contextual data (operation 340). Finally, the system transmits the contextual data (operation 350), which can include the artificial contextual data, the real contextual data, or both, to an entity or audience, in order to allow the user to obscure her real contextual data. In some embodiments, transmitting the contextual data additionally includes transmitting the real location trace of the user, the artificial location traces of the user, the user's real persona, the user's generated personas corresponding to one or more groups of artificial contextual data, etc.

FIG. 4 presents a flow chart illustrating the generation of an artificial location trace of a user's movement based on historical data in accordance with one embodiment. In this example, the system receives a real location trace of a user's movement (operation 410). The system also receives a departure point and a destination point of a trip (operation 420). The departure point and destination point may be selected from points within the real location trace. Alternatively, the departure point and destination point may be entered by an entity, an audience, or the user. In addition, the system receives a period of time for the trip (operation 430). In one embodiment, the period of time is calculated based on the received departure point, destination point, and real location trace of the user's movement. In another embodiment, the period of time is selected or entered by the user. In some embodiments, the departure point, the destination point, and the period of time are only approximated or estimated data rather than accurate data.

Next, the system retrieves historical location traces of the user's movements based on the received departure point, destination point, and period of time (operation 440). The historical location traces have similar departure points, destination points, and/or periods of time to the received departure point, destination point and period of time respectively. The system then generates artificial location traces of the user's movements based on the retrieved historical location traces (operation 450). In some embodiments, the artificial location traces of the user's movements are generated by adding noise to the real location trace or historical location traces of the user's movements.

FIG. 5 presents a flow chart illustrating the generation of an artificial persona for a user based on historical data in accordance with one embodiment. In this example, the system receives real contextual data related to a user (operation 510). The system may also receive a real location trace of the user's movement, as well as the generated artificial location traces of the user's movements as described in the illustration of FIG. 4 above (operation 520). Next, the system retrieves historical contextual data related to the user (operation 530) based on the real contextual data of the user and the real and artificial location traces of the user's movement. Subsequently, the system generates artificial contextual data (operation 540) based on the retrieved historical contextual data related to the user. The system then groups the artificial contextual data to generate artificial persona for the user (operation 550).

Contextual Data

Figure 6:
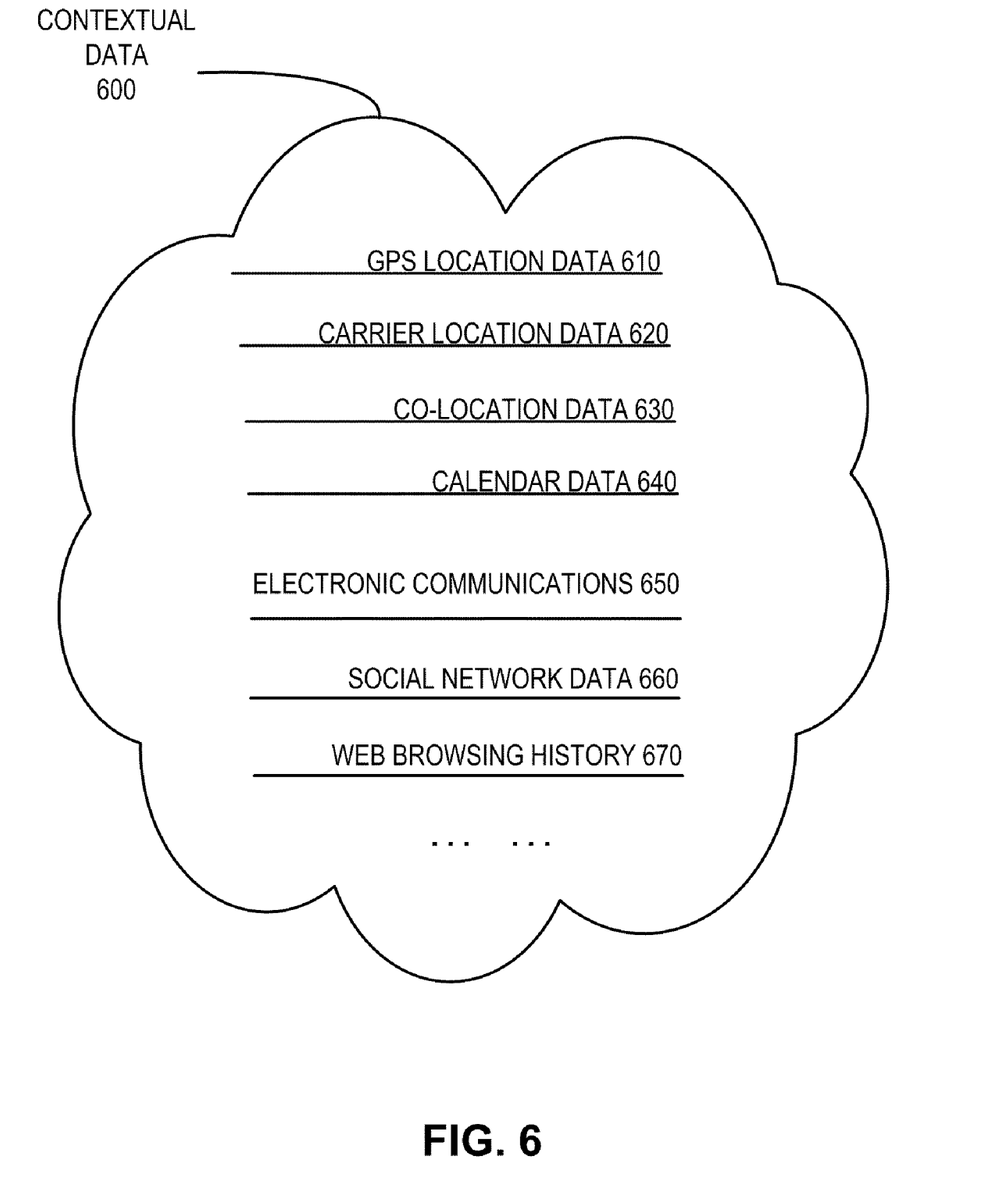
FIG. 6 illustrates a set of exemplary contextual data in accordance with an embodiment of the present invention.

FIG. 6 illustrates a set of exemplary contextual data in accordance with one embodiment of the present invention. Contextual data 600 are used to describe the happenings in a user's life, such as events to attend, real-time status, plans, behaviors, environments, and so on. The form of contextual data 600 can be a text string, an image, a video and/or audio clip, etc. Contextual data 600 are collected via different ways. Based on different collection mechanisms, contextual data 600 can include, but are not limited to, GPS location data 610, carrier location data 620, co-location data 630, calendar data 640, electronic communications 650, social network data 660, web browsing history 670, etc. In some embodiments, contextual data 600 are generated by adding noise data to collected real contextual data. In other embodiments, contextual data 600 are generated by replicating historical contextual data related to the user, or adding noise to historical real or artificial contextual data.

User Persona

Figure 7:
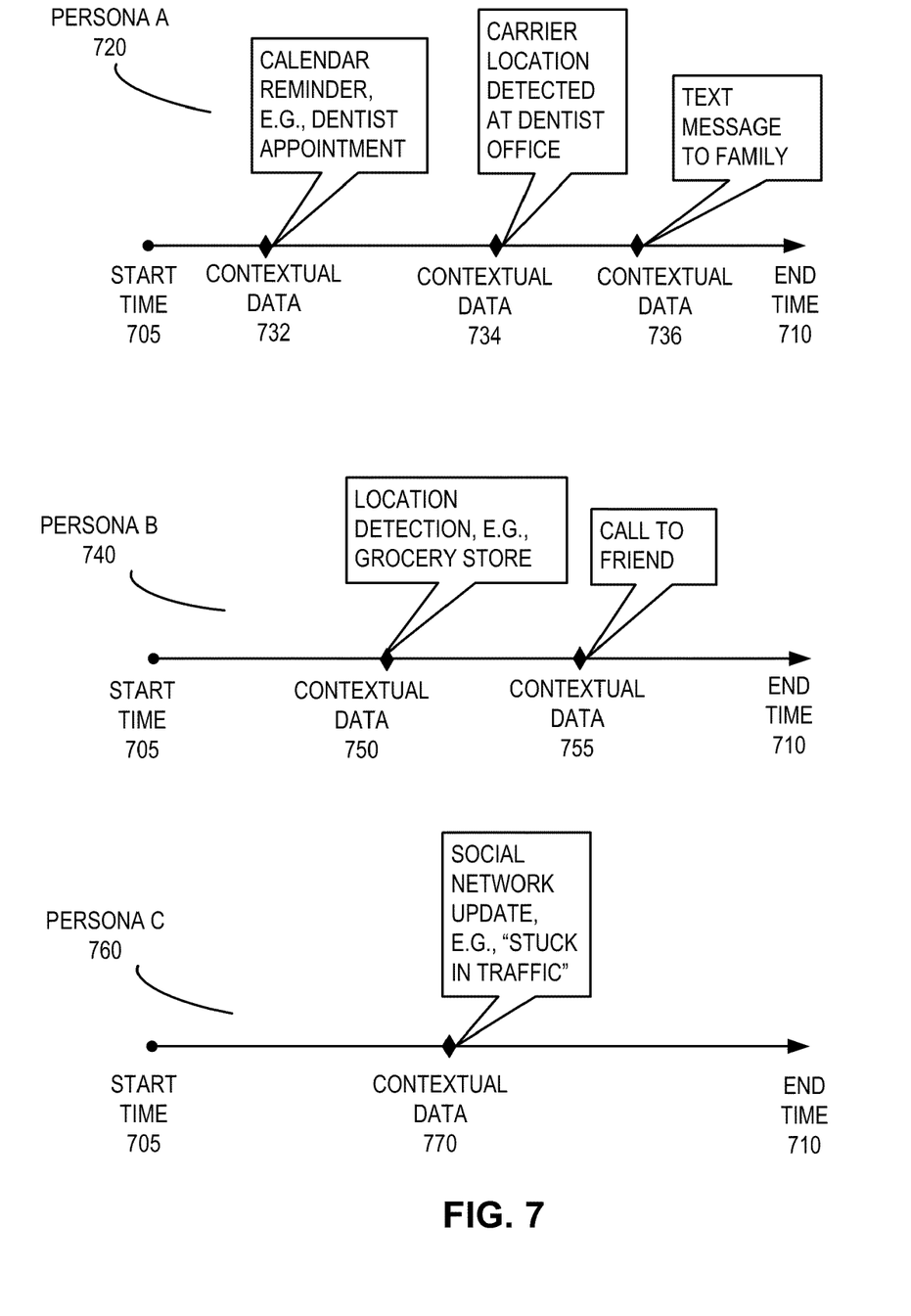
FIG. 7 illustrates exemplary artificial personas in accordance with an embodiment of the present invention.

FIG. 7 illustrates exemplary artificial personas in accordance with one embodiment. Suppose that, in reality, the user leaves her office early on a weekday afternoon and drives home, but because of a long telephone conversation that she receives on her way home, it takes her longer than usual to arrive at home. She does not want her family and friends to know the real reason why she got home late. In other words, she'd like to hide her real location trace from her audience.

FIG. 7 illustrates a few possible contextual data that can be generated to obscure the user's real contextual data. In one embodiment, the system receives a start time 705 and an end time 710, and generates artificial contextual data (e.g., contextual data 732, 734, 736, 750, 755, and 770) related to a user between the start time 705 and the end time 710. In this example, the artificial contextual data are grouped into three different groups, i.e., Persona A 720, Persona B 740, and Persona C 760.

Persona A 720 represents one example of what could be happening around the user between start time 705 and end time 710. For example, contextual data associated with Persona A 720 might include a calendar reminder, such as a dentist appointment, at a time point corresponding to contextual data 732, a detection of carrier location that maps to the geographic location of a dentist's office at a time point corresponding to contextual data 734, and a text message sent to a family member at a time point corresponding to contextual data 736. It is important that these artificial contextual data are inherently consistent with each other, such that an audience would not suspect that it is unrealistic because of potentially conflicting information therein. On the other hand, the persona generator can improve the credibility of the generated artificial contextual data by creating some kind of coherency. Here, in Persona A, a calendar reminder for a dentist appointment is generated and put in the user's electronic calendar on the user's computer, or her portable device, or online. Thereafter, the generated contextual data shows that she is physically located at a dentist's office.

This connection between the generated calendar data and the detection of the user's physical location enhances the credibility of both contextual data 732 and contextual data 734. Therefore, an audience would likely interpret Persona A as something the user has actually done between the start time 705 and the end time 710, i.e., visiting a dentist's office on her way home.

Persona B 740 is another example of a group of generated artificial contextual data. In this example, a detection of GPS location at a grocery store is generated at a time point corresponding to contextual data 750, and a call to a friend is generated at a time point corresponding to contextual data 755. Thus, an audience would likely interpret Persona B as something the user has actually done between the start time 705 and the end time 710, i.e., shopping at a grocery store on her way home.

Likewise, Persona C 760 illustrates another group of generated artificial contextual data. In this example, a social network update message is generated at a time point corresponding to contextual data 770. The message reads, for example, "Stuck in traffic." Hence, an audience would likely think that the user got home late because of a traffic jam upon viewing Persona C 760. Note that, in order to increase the credibility of Persona C 760, the system may also generate an artificial location trace for the user such that the user's location trace shows that she takes a route, e.g., on a highway, with a real-time traffic jam, whereas the user takes a country road that does not have any traffic jam in reality.

In summary, for all of Persona A 720, Persona B 740, and Persona C 760, the generated artificial contextual data within each group are coherent. Moreover, the artificial contextual data are made consistent with the user's location trace. In some embodiments, if the user's real location trace is inconsistent with the artificial contextual data, the system can resolve the inconsistency by generating an artificial location trace of the user's movement that is consistent with the group of artificial contextual data. Also, not all of the contextual data in a group need to be artificially generated. A person skilled in the art would understand that the artificial contextual data can be mixed together with the real contextual data within a group. For example, in Persona A, at time point 736, the contextual data correspond to a text message to a family member, which might read "I'll be home late today." As described above, this message can be artificially generated. Alternatively, it can be an actual text message that the user sends to her family member in reality after she finishes the long telephone conversation.

Apparatus for Generating Artificial Contextual Data

Figure 8:
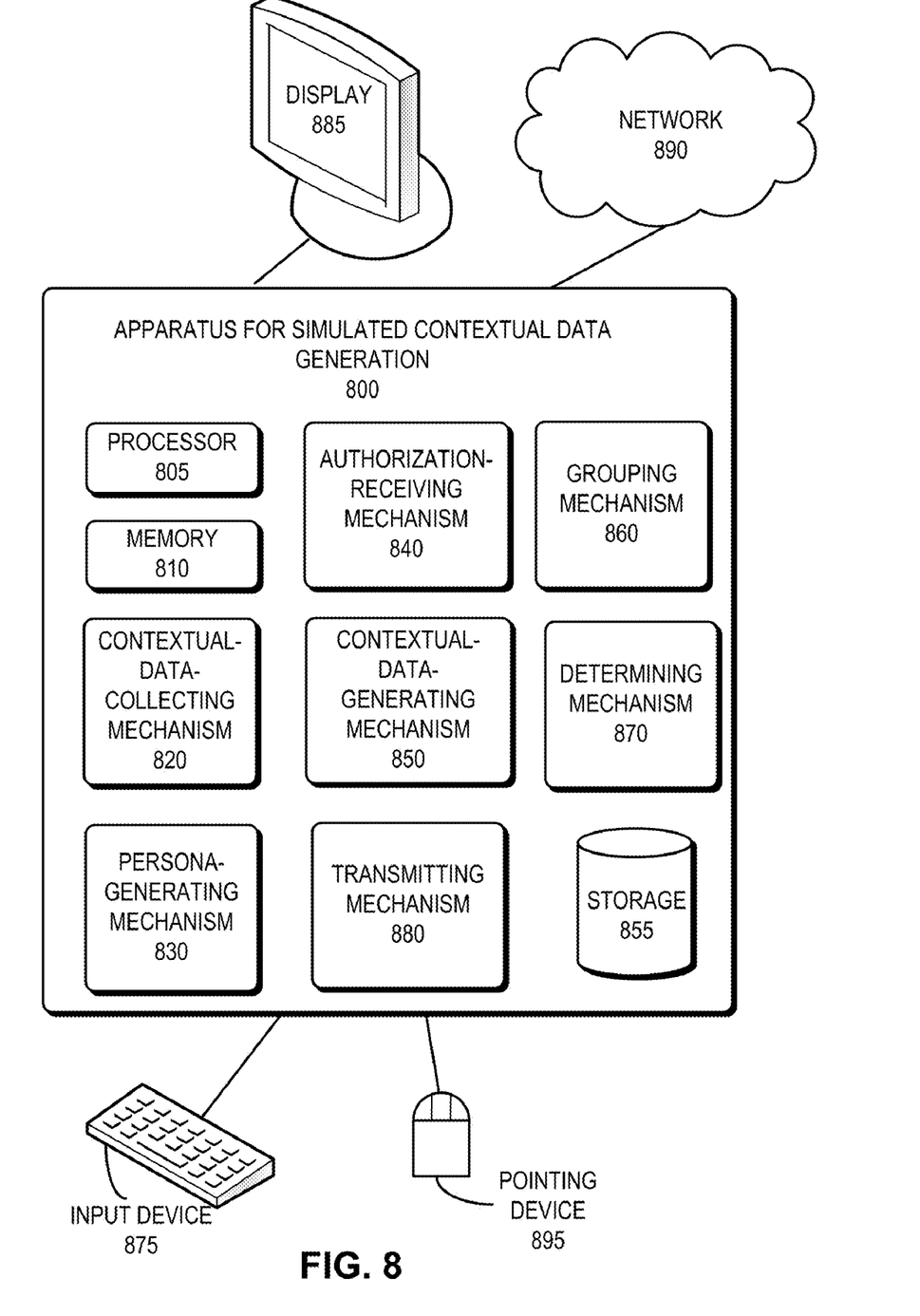
FIG. 8 presents a block diagram of an apparatus for protecting privacy by generating artificial contextual data in accordance with an embodiment of the present invention.

FIG. 8 presents a block diagram of an apparatus 800 for protecting privacy by generating artificial contextual data in accordance with one embodiment. Apparatus 800 includes a process 805, a memory 810, a contextual-data-collecting mechanism 820, a persona-generating-mechanism 830, an authorization-receiving mechanism 840, a contextual-data-generating mechanism 850, a grouping mechanism 860, a determining mechanism 870, a transmitting mechanism 880, and storage 855. Apparatus 800 can be coupled with a display 885, a network 890, an input device 875, and a pointing device 895.

Contextual-data-collecting mechanism 820 collects contextual data related to a user, and can be any receiving device or component, such as a network port, a wireless receiver, a radio receiver, a media receiver, etc.

Persona-generating mechanism 830 receives the contextual data and location trace of a user, and generates an artificial persona of the user based on the contextual data and the location trace. Persona-generating mechanism 830 can be any type of computing device with a processing logic.

Authorization-receiving mechanism 840 receives an authorization decision from the user, and processes the authorization decision to determine whether the user has granted authorization to an audience. If so, authorization-receiving mechanism 840 passes the user authorization to the determining mechanism 870, such that the audience is allowed to distinguish the artificial contextual data of the user from the real contextual data of the user. Authorization-receiving mechanism 840 can be any type of receiving device or component, such as a network port, a wireless receiver, a radio receiver, a media receiver, etc.

Contextual-data-generating mechanism 850 receives a real location trace of the user, generates an artificial location trace of the user based on the real location trace, and can be any type of computing device or component with a processing logic.

Grouping mechanism 860 receives contextual data and groups the contextual data into one or more groups, such that the contextual data within each group are coherent and do not present conflicting information to the audience. Grouping mechanism 860 can be any type of computing device or component with a processing logic.

Determining mechanism 870 receives the user authorization from authorization-receiving mechanism 840, and determines, based on the received user authorization, whether an audience is allowed to distinguish an artificial location trace of the user's movement from a real location trace of the user's movement, or allowed to distinguish artificial contextual data from real contextual data, or both. Determining mechanism 870 can be any type of computing device or component with a processing logic.

Transmitting mechanism 880 transmits contextual data, as well as location traces of the user, to an entity. In one embodiment, the entity presents the received contextual data to an audience. In another embodiment, transmitting mechanism 880 can directly transmit the contextual data to the audience. The data transmitted may include any one or more of: a real location trace of the user, an artificial location trace of the user, real contextual data of the user, artificial contextual data of the user, a real persona for the user, and an artificial persona for the user. Transmitting mechanism 880 can be any type of transmitting device or component, such as a network port, a wireless transmitter, a radio transmitter, a media transmitter, etc.

Storage 855 can include, but is not limited to, a random access memory (RAM), flash memory, a magnetic storage system, an optical storage system, and magneto-optical storage devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for protecting privacy by generating artificial contextual data, comprising:
    collecting real contextual data associated with a user, wherein the collected contextual data includes data indicating one or more of a user activity, a user behavior, a status, and an environment;
    generating artificial contextual data based on the real contextual data related to the user, wherein the artificial contextual data represent happenings in the user's life while obscuring the user's real contextual data;
    grouping the generated contextual data into one or more personas, wherein a respective persona is a group of contextual data which indicates the user's experience; and
    transmitting the generated contextual data of a persona to an entity, thereby obscuring the real contextual data related to the user.

2. The method of claim 1, wherein transmitting the generated contextual data comprises transmitting one or more of:
    the real contextual data;
    the generated contextual data;
    the user's persona; and
    the persona corresponding to the one or more groups.

3. The method of claim 1, further comprising:
    receiving an authorization decision from the user; and
    if the authorization decision indicates that the user grants an authorization to an audience, allowing the audience to distinguish the generated contextual data from the real contextual data.

4. The method of claim 1, further comprising:
    receiving a departure point, a destination point, and a period of time from the user;
    retrieving one or more historical location traces of the user's movement based on the departure point, the destination point, and the period of time; and
    generating the artificial contextual data using the one or more historical location traces.

5. The method of claim 1, wherein the collected contextual data comprise one or more of:
    GPS location data;
    carrier location data;
    co-location data;
    user calendar data;
    electronic communications;
    social network data; and
    web browsing history data.

6. The method of claim 1, wherein generating the artificial contextual data involves adding noise to the real contextual data.

7. The method of claim 1, wherein the artificial contextual data are internally consistent, thereby preventing a third party from distinguishing the artificial contextual data from the real contextual data without the user's explicit authorization.

8. A non-transitory computer-readable storage medium storing instructions that when executed by a computer cause the computer to perform a method for protecting privacy by generating artificial contextual data, the method comprising:
- collecting real contextual data associated with a user, wherein the collected contextual data includes data indicating one or more of a user activity, a user behavior, a status, and an environment;
- generating artificial contextual data based on the real contextual data related to the user, wherein the artificial contextual data represent happenings in the user's life while obscuring the user's real contextual data;
- grouping the generated contextual data into one or more personas, wherein a respective persona is a group of contextual data which indicates the user's experience; and
- transmitting the generated contextual data of a persona to an entity, thereby obscuring the real contextual data related to the user.

9. The non-transitory computer-readable storage medium of claim 8, wherein transmitting the generated contextual data comprises transmitting one or more of:
- the real contextual data;
- the generated contextual data;
- the user's persona; and
- the persona corresponding to the one or more groups.

10. The non-transitory computer-readable storage medium of claim 8, wherein the method further comprises:
- receiving an authorization decision from the user; and
- if the authorization decision indicates that the user grants an authorization to an audience, allowing the audience to distinguish the generated contextual data from the real contextual data.

11. The non-transitory computer-readable storage medium of claim 8, wherein the method further comprises:
- receiving a departure point, a destination point, and a period of time from the user;
- retrieving one or more historical location traces of the user's movement based on the received departure point, destination point, and the period of time; and
- generating the artificial contextual data using the one or more historical location traces.

12. The non-transitory computer-readable storage medium of claim 8, wherein the collected contextual data comprise one or more of:
- GPS location data;
- carrier location data;
- co-location data;
- user calendar data;
- electronic communications;
- social network data; and
- web browsing history data.

13. The non-transitory computer-readable storage medium of claim 8, wherein generating the contextual data involves adding noise to the real contextual data.

14. The non-transitory computer-readable storage medium of claim 8, wherein the artificial contextual data are internally consistent, thereby preventing a third party from distinguishing the artificial contextual data from the real contextual data without the user's explicit authorization.

15. A computer system that protects privacy through generating simulated contextual data, the system comprising:
- a memory;
- a processor;
- a collecting mechanism configured to collect real contextual data associated with a user, wherein the collected contextual data includes data indicating one or more of a user activity, a user behavior, a status, and an environment;
- a persona-generating mechanism configured to generate artificial contextual data based on the real contextual data related to the user, wherein the artificial contextual data represent happenings in the user's life while obscuring the user's real contextual data;
- a grouping mechanism configured to group the generated contextual data into one or more personas, wherein a respective persona is a group of contextual data which indicates the user's experience; and
- a transmitting mechanism configured to transmit the contextual data of a persona to an entity, thereby obscuring the real contextual data related to the user.

16. The computer system of claim 15, wherein, while transmitting the contextual data, the transmitting mechanism is configured to transmit one or more of:
- the real contextual data;
- the generated contextual data;
- the user's persona; and
- the persona corresponding to the one or more groups.

17. The computer system of claim 15, further comprising:
- a receiving mechanism configured to receive an authorization decision from the user; and
- a determining mechanism configured to, if the authorization decision indicates that the user grants an authorization to an audience, allow the audience to distinguish the generated contextual data from the real contextual data.

18. The computer system of claim 15, wherein the trace-generating mechanism is further configured to:
- receive a departure point, a destination point, and a period of time from the user;
- retrieve one or more historical location traces of the user's movement based on the received departure point, the destination point, and the period of time; and
- generate the artificial location trace using the one or more historical location traces.

19. The computer system of claim 15, wherein the collected contextual data comprise one or more of:
- GPS location data;
- carrier location data;
- co-location data;
- user calendar data;
- electronic communications;
- social network data; and
- web browsing history data.

20. The computer system of claim 15, wherein while generating the artificial contextual data, the persona-generating mechanism is configured to add noise to the real contextual data.

21. The computer system of claim 15, wherein the artificial contextual data are internally consistent, thereby preventing a third party from distinguishing the artificial contextual data from the real contextual data without the user's explicit authorization.

* * * * *